Oct. 24, 1933.                L. M. WOOLSON                1,932,331
                        INTERNAL COMBUSTION ENGINE
                            Filed July 21, 1930
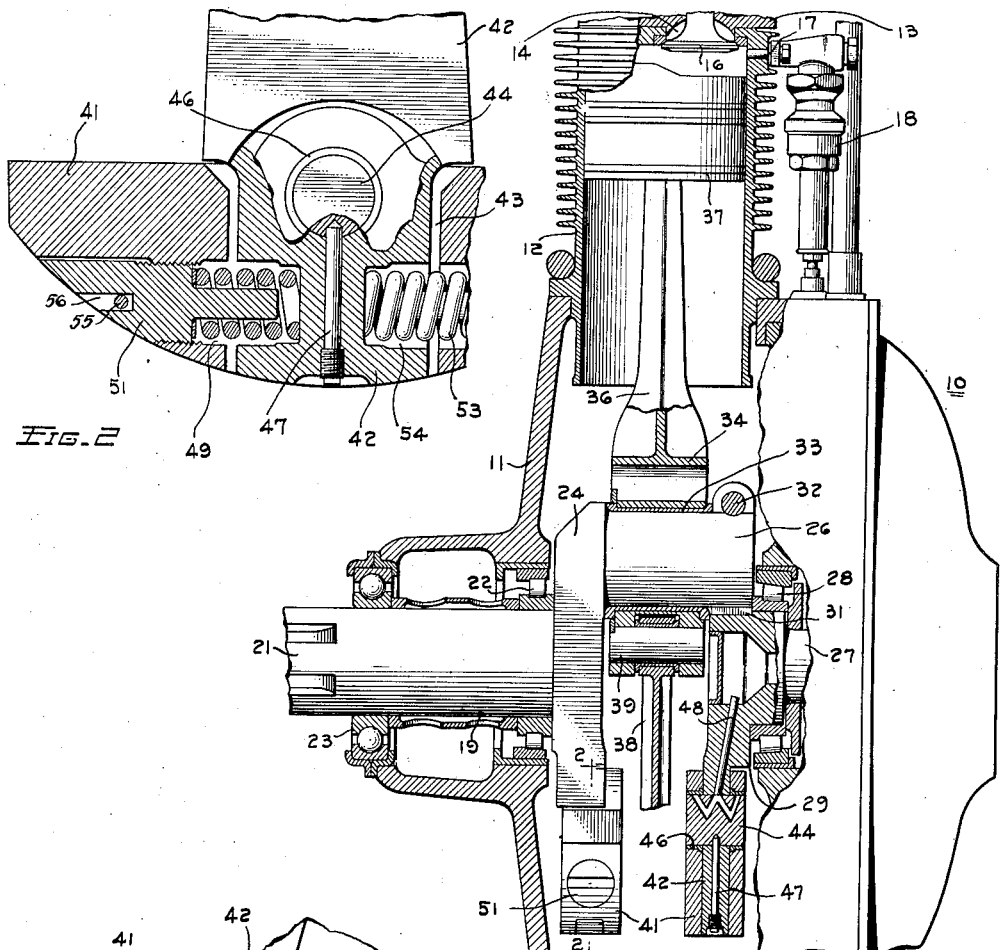
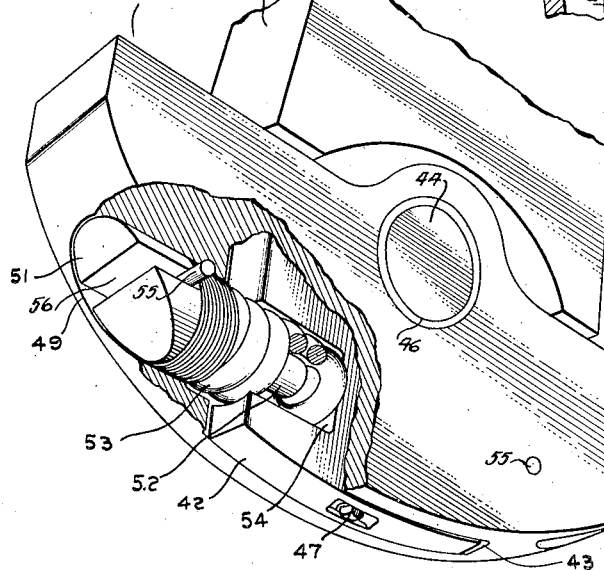
Inventor
LIONEL M. WOOLSON, DECEASED
BY HIS EXECUTRIX
EMMA F. WOOLSON
Attorney Patented Oct. 24, 1933

1,932,331

UNITED STATES PATENT OFFICE 1,932,331

INTERNAL-COMBUSTION ENGINE

Lionel M. Woolson, deceased, late of Detroit, Mich., by Emma F. Woolson, executrix, Bloomfield Village, Mich., assignor to Packard Motor Car Company, Detroit, Mich., a corporation of Michigan Application July 21, 1930. Serial No. 469,323

3 Claims. (Cl. 74—38)

This invention relates to internal combustion engines of the compression-ignition type and it is particularly adapted to use with aircraft engines and other high speed engines of this nature arranged to drive loads of considerable inertia, such as aircraft propellers.

Engines of this character are subjected, at the time of ignition, to peak cylinder pressures, which are of short duration but of considerable magnitude, reaching values as high as twelve hundred pounds per square inch. This is ten times the average cylinder pressure during the working stroke of the engine, and more than twice the maximum pressure of other comparable engines. This peak pressure subjects the pistons, connecting rods, crank shaft, cylinders, and other parts to terrific shock loads that must be taken and transmitted to the driven member. In the crank shaft, these are not only in the form of direct blows delivered through the connecting rods, but are also in the form of high instantaneous torsional stresses caused by the high acceleration given to the rotating parts which have large inertia.

Also, the forced vibrations thus imposed on the crank shaft system may synchronize at particular engine speeds with the natural frequency of the system, thus inducing vibration in the shaft which may grow through resonance to proportions which result in tremendous stresses.

These stresses cannot be met by increasing the size and strength of the crank shaft and other engine parts, since this necessarily involves a material increase in engine weight, which in aircraft engines is prohibitive. Before compression ignition engines can be made practicable for aircraft use, the crank shaft and associated parts must be of a size and weight favorably comparable with the corresponding parts of existing aircraft engines of similar power, and overstressing of the shafts from the forces described must be prevented in some other way.

It is one of the objects of the present invention to provide a compression ignition engine of the character designated with a crank shaft and associated parts adapted to reduce the stresses caused by peak cylinder pressures.

Another object of the invention is to provide such an engine with a crank shaft system having means acting to cushion the application of direct shocks and to damp induced disturbance.

Another object of the invention is to provide an engine with a crank shaft system of conventional size and weight in which a portion of the mass shall yield or lag upon the application of excessive torque to reduce the inertia stress, said mass portion being subsequently advanced to its initial position.

A further object of the invention is to provide a crank shaft for compression ignition engines as described having a balancing mass movable in response to excessive operative forces to reduce the inertia, and operable during such movement to damp disturbances induced in the shaft.

Other objects of the invention will appear from the following description taken in connection with the drawing, which forms a part of this specification, and in which:

Fig. 1 is a longitudinal section through a portion of a compression ignition engine arranged to drive a load of high inertia, showing the application of this invention thereto;

Fig. 2 is an enlarged section taken substantially on the line 2—2 of Fig. 1, and Fig. 3 is an enlarged perspective view, partially broken away, of a counterweight such as shown in Fig. 1, illustrating a form of damping and cushioning device suitable for the practice of this invention.

Referring to the drawing, at 10 is shown an aircraft engine of the well-known radial type having a crank case 11 on which are mounted a number of radially disposed cylinders, one of which is shown at 12. Each of the cylinders 12 is provided with an integral head 13 having an air inlet and exhaust port 14, controlled by a valve 16 and adapted to be opened in timed relation to the engine by suitable valve operating mechanism, not shown in detail, which may be driven from the engine crank shaft or other moving engine part in the usual way. A fuel nozzle 17 communicates with the interior of each of the cylinders and with a suitable fuel pump 18 which is also driven from the engine in timed relation thereto, there being a pump 18 for each of the engine cylinders. This pump 18 operates to inject a measured charge of liquid fuel into the cylinder at the proper time in the cycle thereof, as is well understood in the art to which this invention relates.

The crank shaft system of this invention comprises the engine crank shaft and the elements associated therewith including the crank, the connecting and link rods and their hub, and the counterweights or balancing masses.

In the embodiment illustrated, the crank shaft 19 is of the built-up type having a forwardly extending portion 21 journaled in the bearings 22 and 23. This forward or driving portion of the crank shaft supports and drives the engine load which may comprise an aircraft propeller (not shown).

The crank shaft 19 also comprises an integral crank arm 24 with a crank pin 26 thereon. An aligned portion 27, journaled in a bearing 28, is provided with an integral crank arm 29, secured to the crank pin 26 in any suitable manner as by a key 31 and a clamp bolt 32, the arms 24 and 29 and the pin 26 forming the crank of the shaft 19. Journaled on the crank pin 26 through a suitable bushing 33 is the hub portion 34 of a master connecting rod 36, the other end of which is connected to a piston 37 in one of the engine cylinders 12. Similar pistons (not shown) in the other cylinders of the engine are connected by means of link rods such as 38 to link pins such as 39, pivotally mounted in the hub portion 34 and arranged in circular spaced relation therein around the crank pin 26 in the well-known manner, so that the pressures of all the pistons 37 are communicated to and drive the crank shaft 19.

The unbalanced rotating masses of the crank shaft system, which include the crank, the master rod and its hub, and the link rods and associated parts, are adapted to be counterbalanced by suitable counterweights, which as best shown in Figs. 2 and 3 comprise segmental weight members or masses 41, one of which is mounted opposite each crank arm on an integral extension 42 thereof. Each of the extensions 42 projects through a slot 43 formed in the median plane of the weight member, and said member is pivotally secured thereto by a pivot pin 44, mounted in the extension and on which the member is journaled as by bushings 46. The pins 44 may be secured to the extensions 42 by any convenient means such as a locking pin 47, and they may be lubricated through conduits 48 which communicate with the engine lubricating system (not shown).

The counterweights 41 are necessary to bring the large off-center masses into static balance about the crank shaft axis, but it will be evident that their mass is responsible for a large part of the inertia of the crank shaft system which must be overcome in accelerating the crank shaft, and that the high acceleration given to these masses by piston thrust at the high pressure moment of ignition would cause tremendous stress in the crank shaft. According to the present invention these members are resiliently connected to the crank arm extensions so that they may yield somewhat and thereby cushion the piston thrust and the resulting applied torque and hence materially lower attendant stresses. To this end each of the weights is provided with longitudinally aligned bores 49 which extend from its arcuate face into communication with the slot 43 at right angles thereto. The outer ends of these bores are closed by threaded plugs 51 having inwardly disposed guide extensions 52, which serve as abutments for stiff opposed compression springs 53. The inner ends of the springs 53 are seated in recesses 54 formed in the crank arm extension 42, and the degree of compression of these springs may be regulated by adjusting the threaded plugs 51 within the bores 49 so that they bear with equal and opposite force on this extension. Thus it will be evident that the counterweight is being continually urged towards its normal or neutral position with respect to the crank arm. It will be noted that pins 55 which may be introduced in suitable apertures in the counterweight 41 to extend through slots 56 in the plugs 51 are provided for the purpose of locking these plugs in position after they have been adjusted to the proper extent. On removal of the pins 55 and the plugs 51 the springs 53 can be withdrawn for inspection or replacement. Under the sudden impact caused by the explosion pressures in the engine cylinders, one of the springs 53 will yield to permit each of the counterweights to move slightly on its pivot pin 44. Because of this construction, a large portion of the mass of the shaft assembly is coupled to the shaft through resilient means which yields under the sudden torque at the time of ignition, absorbing or storing a part of the energy and permitting the inertia to be overcome more gradually and the mass less suddenly accelerated. Evidently such elastic cushioning of the shock forces applied to the crank shaft greatly reduces the stresses that would otherwise occur in that member. After the moment of peak pressure has passed, a part of the energy which was absorbed or stored in compressing the springs 53 is returned to the crank shaft system through the reaction of the springs which at the same time restores the counterweight to its neutral position with respect to the arm 42.

It will be evident that this invention provides for the introduction into the crank shaft system of considerable resilience, represented by the springs 53. This resilience permits the counterweights, which represent a large portion of the mass of the system, to lag behind the crank shaft at the moments of peak torque, so that the acceleration thereof is slower, thus greatly reducing the inertia stresses which would otherwise be imposed upon the shaft. At the same time such increase in the resilience of the system, as in any other vibratory system, lowers the positions in the engine speed range at which resonant vibrations occur.

To prevent the resonant growth of such vibrations as may be induced in the crank shaft system by the forced vibration, the present invention proposes to provide adequate damping during the disturbance. Such damping is effected by mechanical friction in the pivotal mounting of the counterweights 41, which mechanical friction serves to dissipate vibratory energy at a rate sufficient to prevent its growth through resonance. The damping friction at the counterweight mounting occurs principally between the pin 44 and its cooperating bearings, these being subjected to high pressures because of the centrifugal force acting on the weights, and to this friction may be added that produced by the crank arm extension 42 being a close fit in the slot 43 so that the side faces of the extension are in rubbing contact with the side walls of the slot.

It will be noted that the damping effect will continue as long as there is any relative movement between the counterweights and the arm extensions, such damping extending through both the period in which energy is stored in the resilient members and the period of energy return.

The invention, therefore, provides a device for preventing the overstressing or failure of the shafts of engines of this type and it permits the use of a light-weight shaft adapted to safely carry the working stresses with a proper factor of safety.

Although the invention has been specifically described, the principles involved are susceptible of numerous applications which will readily occur to persons skilled in the art. The invention is therefore to be limited only as indicated by the scope of the appended claims.

Having thus described the invention, what is claimed and desired to be secured by Letters Patent is:

1. The combination with an engine crank shaft having a crank arm, of an integral extension in line with the crank arm, a unitary counterweight having a slot adapted to receive the extension and aligned bores normal to said slot, means passing through said extension and the counterweight to pivotally mount the counterweight on the crank arm, opposed springs in the bores and bearing on the extension to resist pivotal movement of the counterweight, and means associated with said counterweight and serving as abutments for said springs.

2. The combination with an engine crank shaft having a crank arm, of an integral projection in line with the crank arm and having notches in its edges, a counterweight for the crank arm having a slot to receive the projection and having bores aligned with said notches, means pivotally mounting said counterweight on said projection, means to close the outer ends of the bores, and coil springs in said bores compressed between the closing means and the notches.

3. The combination with an engine crank shaft having a crank arm, of an integral projection on said arm having oppositely disposed recesses, a counterweight having a slot disposed in the plane of rotation to receive the projection and having a bore intersecting the slot at right angles, abutments closing the outer ends of the bore each having an inwardly disposed guide, a pin extending through the counterweight and the projection to pivotally mount the counterweight thereon, and compression springs in said bore surrounding the guides and seated in opposed relation between the recesses and the abutments to resist pivotal movement of the counterweight.

EMMA F. WOOLSON.
*Executrix of the Estate of Lionel M. Woolson, Deceased.*